US006938977B2

(12) United States Patent
Corbin et al.

(10) Patent No.: US 6,938,977 B2
(45) Date of Patent: Sep. 6, 2005

(54) METHOD FOR IMPROVED CHARACTERIZATION OF SINGLE-PASS BI-DIRECTIONAL PRINTERS

(75) Inventors: David A. Corbin, San Jose, CA (US); Mark Q. Shaw, Meridian, ID (US); Peter A. Torpey, Webster, NY (US)

(73) Assignee: Xerox Corporation, Stamford, CT (US)

( * ) Notice: Subject to any disclaimer, the term of this patent is extended or adjusted under 35 U.S.C. 154(b) by 222 days.

(21) Appl. No.: 10/627,494

(22) Filed: Jul. 25, 2003

(65) Prior Publication Data

US 2005/0018256 A1 Jan. 27, 2005

(51) Int. Cl.[7] .......................... H04N 1/52; H04N 1/56; H04N 1/60

(52) U.S. Cl. .......................... 347/19; 347/43; 358/1.9; 358/504; 358/518

(58) Field of Search ......................... 358/1.9, 504, 518, 358/520, 523; 382/162, 167; 347/15, 19, 43

(56) References Cited

U.S. PATENT DOCUMENTS 6,354,692 B1 * 3/2002 Ross ........................... 347/41
2004/0196476 A1 * 10/2004 Yang et al. .................. 358/1.9
2005/0018221 A1 * 1/2005 Zeng et al. .................. 358/1.9

* cited by examiner

*Primary Examiner*—K. Feggins
*Assistant Examiner*—Julian D. Huffman
(74) *Attorney, Agent, or Firm*—Fay, Sharpe, Fagan, Minnich & McKee, LLP

(57) ABSTRACT

The method of the present invention involves first estimating the common gamut of the colors that this printer is expected to reproduce. A left-to-right test target is printed in single-pass, uni-directional print mode, (printing on left-to-right scans only) and a color calibration table for left-to-right printing is generated. A right-to-left test pattern is printed in single-pass, uni-directional print mode, (printing on right-to-left scans only) and a color calibration table specific for right-to-left printing is generated. The next step of the present invention involves determining the mathematical intersection of the gamuts produced by printing in left-to-right mode only and by printing in right-to-left mode only. This is done by, first printing the left-to-right test target processed by the color calibration table associated with the primary print direction. Colors which are within the gamut of both left-to-right only and right-to-left only printing are identified by their similarity or distance from each other in color space. Thereafter new calibration tables are generated for each printing direction with the starting gamut (range of achievable colors) based on a slightly smaller gamut than the gamut intersection identified.

14 Claims, 7 Drawing Sheets

METHOD FOR IMPROVED CHARACTERIZATION OF SINGLE-PASS BI-DIRECTIONAL PRINTERS

FIELD OF THE INVENTION

The present invention generally relates to profiling colorimetric reproduction in color printers and, more particularly, to methods for profiling a printer's colorimetric reproduction characteristics in printers with reciprocating print heads.

BACKGROUND OF THE INVENTION

In the arts, inkjet printers have a paper path that moves the paper in one axis of motion and a carriage that moves back and forth (reciprocates) over the paper while the carriage's inkjet heads are ejecting ink. Popular ink-jet printing systems have four (4) printheads aligned horizontally and made to scan side-to-side in order to print a single swath of an image. A swath is a strip of printed image that is equal to the height of the print heads. This design helps keep the platen under the paper as narrow as possible. One disadvantage of putting all the heads in-line is that, although the same primary colors are used on each pass of the carriage, the order in which the colors are laid down determines, to some extent, the resulting composite colors produced. After each swath is printed, the paper is advanced vertically prior to printing the next swath. After each printing pass the media is moved one head height (or a fraction thereof) and the carriage again moves across the paper.

In a reciprocating carriage print head where the print heads are aligned horizontally in the scan direction, it is sometimes desirable to print in a single-pass, bi-directional mode as increased productivity is often obtained when printing in this mode because the printhead assembly prints all image pixels in a given swath by scanning from left-to-right in the swath, having the paper advance vertically, and then printing all image pixels in the next swath by scanning from right-to-left. After the paper advance, the process starts over with a left-to-right scan.

For the most part, color differences are due to the order in which the ink is ejected on the paper. In one swath the inks are laid down in a left-to-right order, whereas in the following swatch, the inks are laid down in a right-to-left order. When printing left-to-right, the inks are usually ejected in the order of: yellow, magenta, cyan, black. When printing right-to-left, the inks are usually ejected in the order: black, cyan, magenta, yellow. A result is that a red color printed in one swath may not have the same appearance in a successive swath because the red color produced by printing yellow first followed by magenta on top is not necessarily the same red produced when printing magenta with yellow on top. When laying light cyan ink on top of dark cyan, the color will be different than if the dark cyan ink were laid on top of the light cyan. This is due to differences in the individual inks absorption and scattering properties, the total area coverage of each of the inks, and the halftone algorithm. In general, this means that certain colors such as reds, blues, browns, flesh tones, etc. that can be obtained with one direction of printing may not necessarily be able to be obtained with the reverse direction of printing. These differences are often referred to as color banding and appear as alternating stripes equal in height to the height of the head.

To get a typical printer's output to match a standard other than the standard that the ink-set was designed to match (assuming it was designed to match a standard), a method called color profiling is typically used. Color profiling is an attempt to characterize the printer's colorimetric reproduction characteristics given a specific set of inks, media, and environmental conditions and use this information along with color correction data that attempts to get the printer's output to match a standard.

Attempts at reducing color banding have relied on employing different color calibration tables for left-to-right and right-to-left swaths. In this approach, two color calibration tables are generated. The first table is produced by printing a calibration target in a single-pass, unidirectional mode wherein each swath is printed from left-to-right without printing right-to-left. The second table is produced by printing a calibration target in a single-pass, unidirectional mode wherein each swath is printed from right-to-left without printing left-to-right. After both calibrations are complete, two tables are generated and used to produce prints in a single-pass, bi-directional mode. This is done by processing image data contained within swaths printed by scanning the printhead assembly from left-to-right by using the left-to-right color look-up table, and processing image data contained within swaths printed by scanning the printhead assembly from right-to-left by using the right-to-left color look-up table.

Although, in principle, this should be successful at reducing color banding in single-pass, bi-directional printing, the actual results still contain varying degrees of color banding. This is because the color gamut obtainable by printing in one direction is not necessarily the same as the color gamut obtainable by printing in the reverse direction. For example, assume it is desirable to produce a solid red at the very edge of the red gamut. This would be done by printing 100% yellow and 100% magenta on the paper. As discussed, the magenta will be on top of the yellow in one direction and the yellow will be on top of the magenta in the other. Since the maximum amount of ink per color per pass is 100%, the resulting red will not look the same on successive swaths as the size and shape of individual color regions in the left-to-right gamut may be different relative to the regions in the right-to-left gamut, and visa versa. If the only concern was gamut mapping independently for both directions, the results will be predictably poor. There are several reasons for this, relating to gamut size, color resolution, and the accuracy of the interpolation method used to determine intermediate values. If the gamut is too small or the color resolution too high, or if the interpolation method is inaccurate, it is unlikely that the color correction software will come up with identical combinations of primary colors for both directions.

Thus, what is needed in this art is a method, which provides improvement in image quality in print systems that have noticeable (uncorrected) color shifts between the two directions.

BRIEF SUMMARY

The present invention is directed to the problem of color banding in single pass printing with carriage printers, such as inkjet or similar, where the order of application of the inks is dependent on the carriage direction while printing. Although methods of adjusting colors to match in two printing directions is well known in the arts, what is presented is an improvement to the process of characterizing bi-directional color reproduction devices.

The method of the present invention involves first estimating the common gamut of the colors that this printer is expected to reproduce. Two color test targets are defined, each containing a wide range of color patches spanning color space. Preferably comprising color patches, which are expected to be outside the gamut of the printer as well as color patches expected to be within the gamut of the printer. The left-to-right test target is printed in single-pass, uni-directional print mode, (printing on left-to-right scans only) and a color calibration table for left-to-right printing is generated. The right-to-left test target is printed in single-pass, unidirectional print mode, (printing on right-to-left scans only) and a color calibration table specific for right-to-left printing is generated. The next step of the present invention involves determining the mathematical intersection of the gamuts produced by printing in left-to-right mode only and by printing in right-to-left mode only. This is done by, first printing the left-to-right test target processed by the color calibration table associated with the primary print direction. Then, printing the right-to-left test target processed by the color calibration table associated with the secondary print direction and comparing each of the corresponding outputs. Colors which are within the gamut of both left-to-right only and right-to-left only printing are identified by their similarity or distance from each other in color space. In other words, if two corresponding color patches differ by delta E<E0, then these colors are within the gamut of each printing direction. Conversely, if two corresponding colors differ by an amount of delta E>E0, then the two colors are not within the intersection of the left-to-right only and right-to-left only printing modes. Thereafter and having obtained the gamut intersection of left-to-right and right-to-left printing modes, new calibration tables are generated for each printing direction with the starting gamut (range of achievable colors) based on a slightly smaller gamut than the gamut intersection identified. In other words, the common color gamut is clipped in both directions to the intersection of the gamuts achievable in each direction. This becomes the new starting gamut for the iterative calibration process. Color calibration tables are successively generated for each of the left-to-right and right-to-left printing modes. Once calibration has been concluded for each print direction, the printer is now characterized to print in bi-directional mode.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE SPECIFICATION

Figure 1:
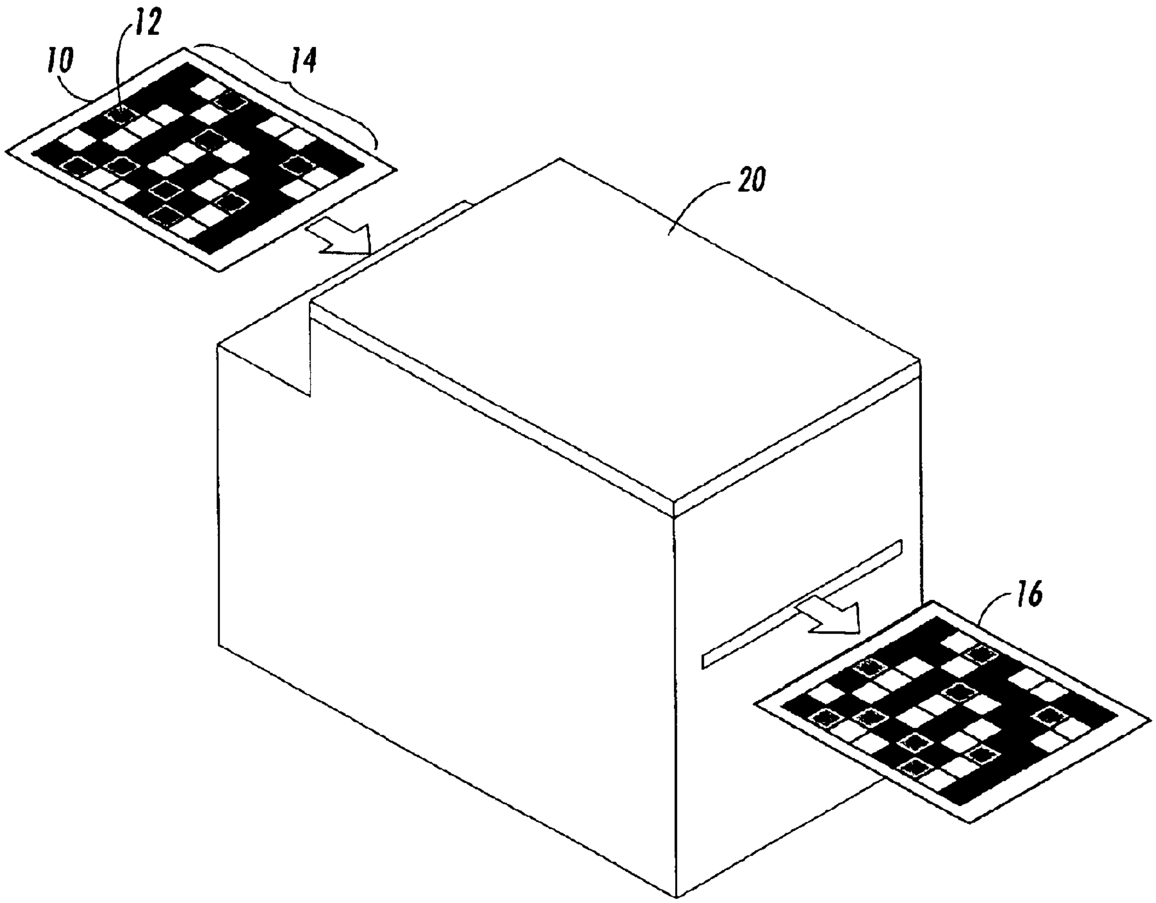
FIG. 1 illustrates that part of the generic characterization process of printing device 20 showing the initial target test page 10 having a plurality of individual colored patches 12 shown collectively at 14 which will be printed to produce a test result page 16.

What is presented is an improvement to the art of characterizing color reproduction in both directions. Characterization data is used to generate a separate profile for a primary (right-to-left) print direction and one for the secondary (left-to-right) print direction.

When rasterizing, the RIP uses the correct profile for each stream of raster data. As the output image is being rasterized by the rendering software, the software will generate the raster sets such that a set used to print in the right-to-left direction uses the right-to-left profiling data and vice-versa for sets to be printed in the opposite direction. As the method of the present invention keeps color differences between swaths within the limits of the amount of hue shift a human eye can detect, the outputs look virtually identical.

One skilled in this art would have an understanding of printer characterization processes and preferably experience performing the same.

Printer characterization involves first estimating or otherwise obtaining the common gamut of the colors that this printer is expected to reproduce, i.e., range of colors achievable by the printer. A standard test target having patches of colors within the gamut is needed initially. This target page, comprising colored patches, printed by the printer being characterized. The printed result is analyzed by a calorimeter or spectrophotometer commonly found in the arts. Colorimetric values help determine just how closely the respective colored patches of the input page compare to their respective colors on the printer's output page. Colored patches determined to have nearly identical colors (to an acceptable error) by the colorimetry data are considered matched pairs of colored patches. In other words, the output color is nearly identical to the input color. Thus, the printer does not need further calibration with respect to these colors. For those colored patches that do not yet match, the colorimetric data is used along with any other considerations, e.g., illumination, etc., to generate a color calibration table comprising, in part, a mapping of various adjustments needed to be made to the printer in order to bring the outstanding colors into color alignment with their respective input patches. Calibration information is entered into the printer's color management engine in preparation for the next iteration.

During the next print cycle, the color management engine will make color adjustments in the printer's CMYK counts accordingly. With the engine re-calibrated, a new test page is produce containing only the remaining color patches. Only patches without a match are printed each successive iteration. This new test target page is printed. A colorimetric analysis of this iteration's target provides data for the determination of matching pairs of colored patches.

A new color calibration table is generated. The printer is re-calibrated for this run by the color management engine being updated. Patches determined to be identical are removed from the target page. The target page for the next iteration then only contains those colored patches whose colors still do not match. This process of testing, analyzing, and re-calibrating is repeated until either all output patches match their respective input patches or a pre-determined criteria for ending calibration has been met.

Figure 2:
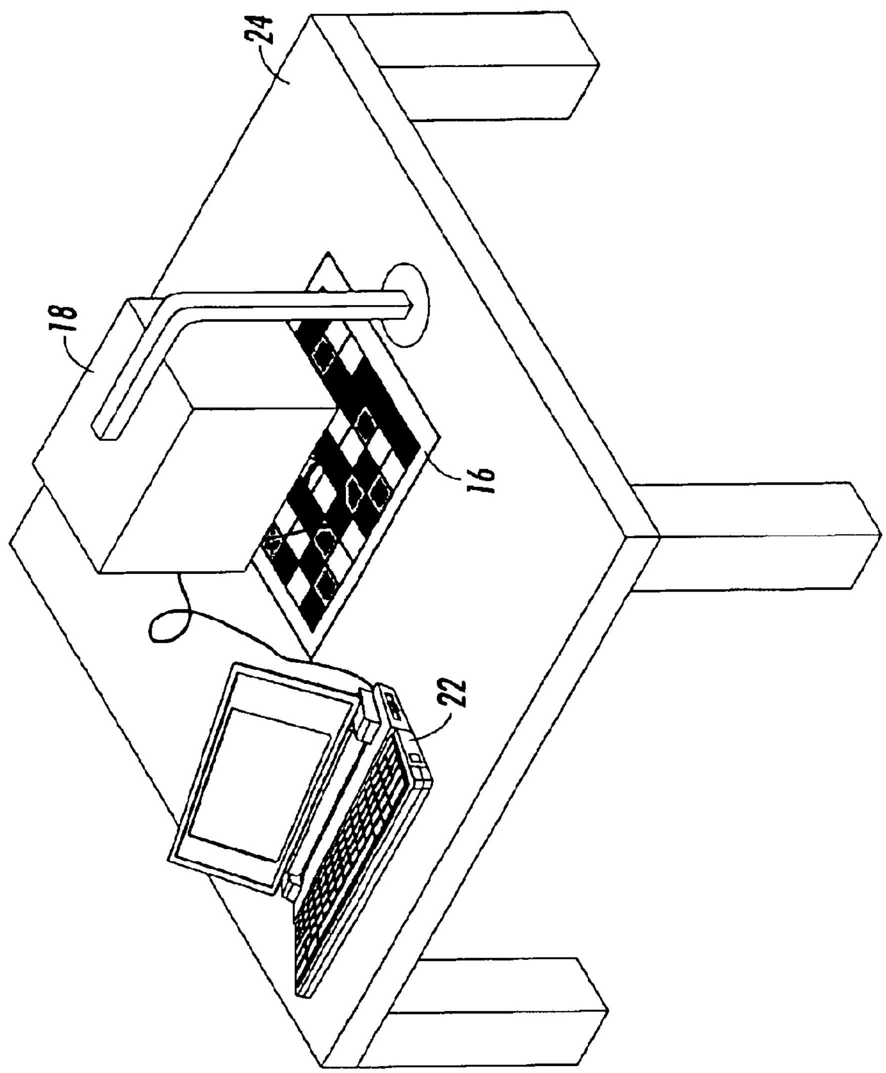
FIG. 2 illustrates generic colorimeter device 18 on work-bench 26 analyzing each of the individual colored patches 12 of output test target 16 and communicating the resulting colorimetric data values to laptop computer 22.

For an illustration of the printer characterization process described above, attention is directed to FIG. 1. A standard test target 10 has a plurality of individual colored patches 12, shown collectively at 14. The target page is fed into printing device 20. The printer does its best job at reproducing the colored patches of page 10 as printed output 16. In FIG. 2, a generic calorimeter device 18 atop workbench 26 is used to analyze the colored patches of printed page 16. Preferably, the colorimetric data associated with colored patches of the initial target page is already available. The resulting colorimetric data generated thereby is communicated or otherwise provide to laptop computer 22 for further computational analysis.

Figure 3:
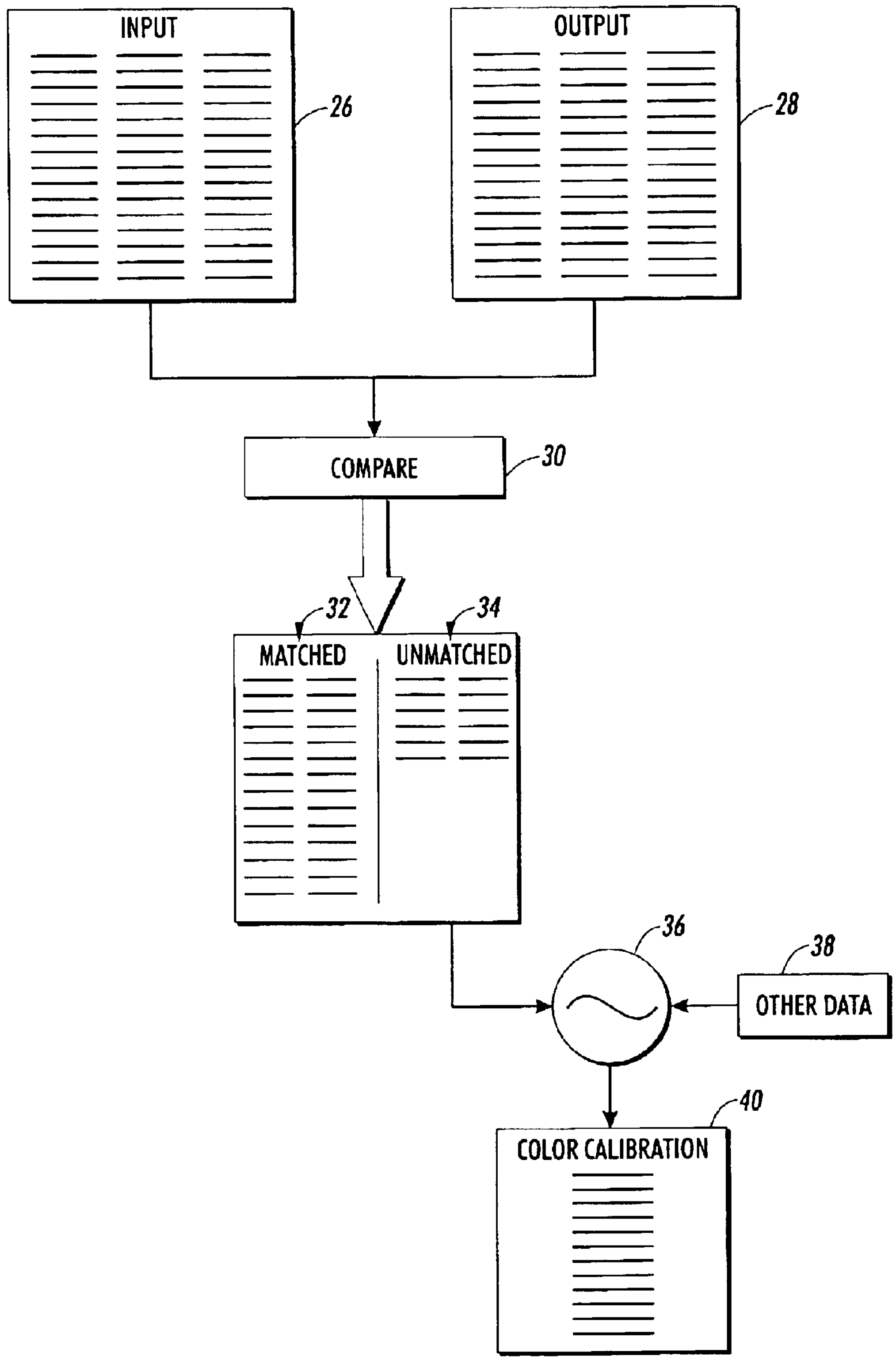
FIG. 3 shows generally the data analysis done by laptop 22 wherein the colorimetric data 26 associated with the colored patches 14 of input target page 10 being comparatively processed with the colorimetric data 28 associated with the colored patches of output target 16 with matched colored patches 32 are separated from unmatched colored patches 34 from the computation of this iteration's color adjustments 36 along with other data 38 to produce color calibration table 40.

With reference now being made to FIG. 3, data analysis is performed on laptop 22. Colorimetric data 26 associated with the colored patches 14 of input target page 10 is processed 30 with the colorimetric data 28 associated with the colored patches of output target 16. Matched colored patches 32 are identified and separated from unmatched colored patches 34. Computations 36 are performed on the data associated with unmatched pairs 34, along with data associated with other desired considerations 38. Color calibration table 40 is generated thereby.

Figure 4:
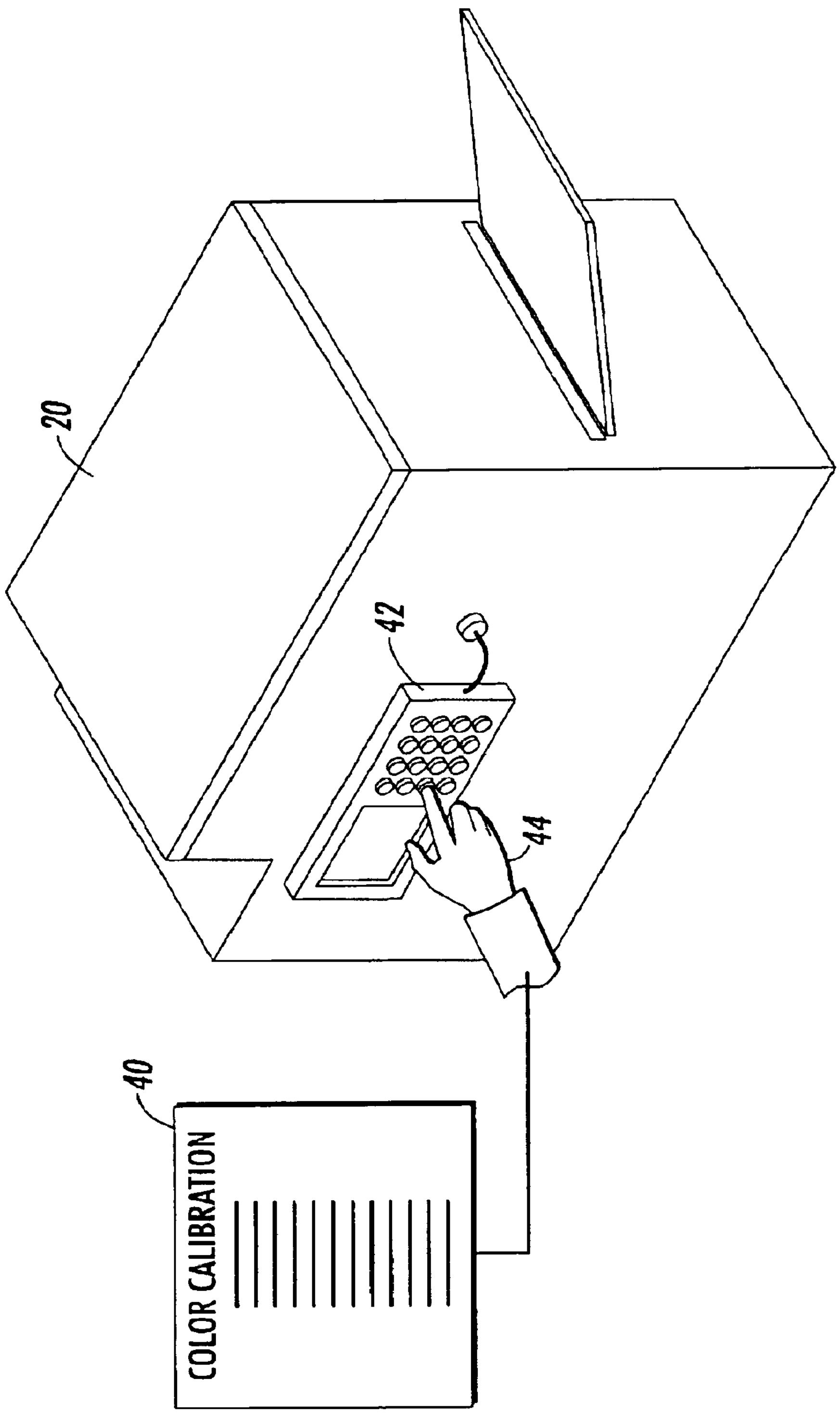
FIG. 4 illustrates a user 44 using the data of calibration table 40 to re-calibrate the color management engine of printer 20 through control panel 42.
Figure 5:
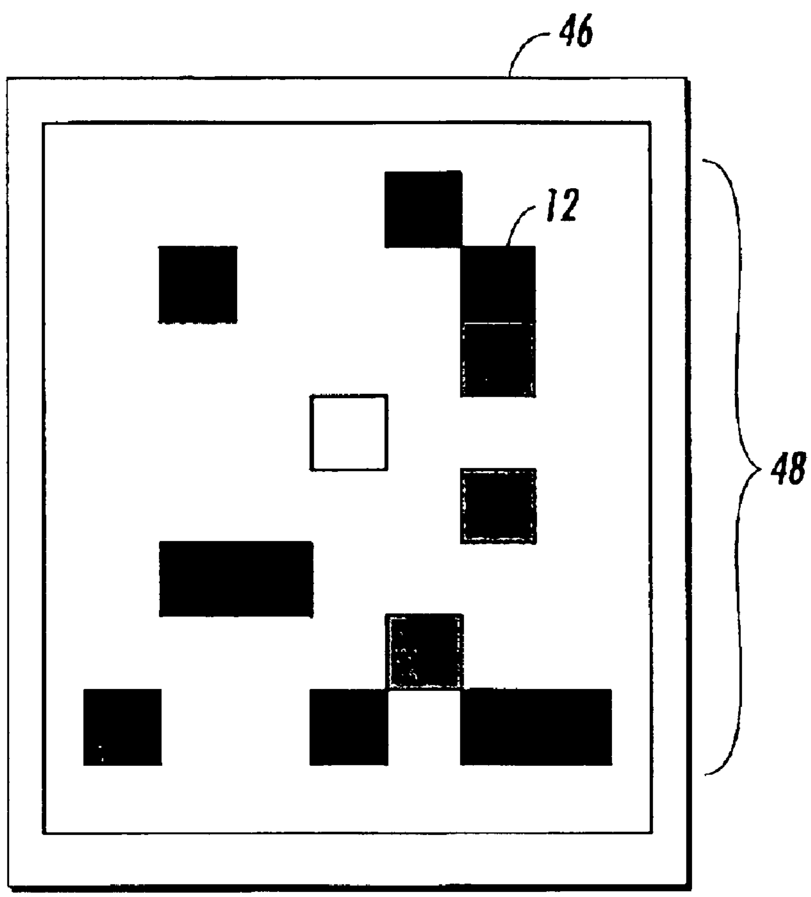
FIG. 5 shows the test target page 46 intended to be printed on printer 20 this next iteration wherein the test target page only has those individual colored patches 12, collectively at 48, which have not yet been matched, the specific colors of which printer 20 still needs to be calibrated.

Attention is now directed to FIG. 4. Using the data generally comprising calibration table 40, a technician uses control panel 42 to re-calibrate, shown at 44, the printer's color management engine (not shown). Alternatively, the laptop is placed in electronic communication with the color management engine and the engine is re-calibrated through software tools. Before the next print cycle, a new test target page is made. FIG. 5 shows the test target page 46 intended to be printed on printer 20 this next iteration. Test target page 46 only preferably contains those colored patches 12, shown collectively at 48, which have not yet been matched. Colored patches already matched are preferably removed from the target page of the iteration because the printing device already reproduces all those colors within desired limits as determined by the colorimetry data and computational analysis. Only for certain colors, illustrated at 46, does printer 20 still need to be calibrated for.

How many iterations involving how many total patches are needed? This depends, in large part, on the quality of the color management engine's interpolation algorithms and how critical the problem turns out to be with that particular system. The amount of direction dependent color shift there is will depend on many factors. The ink and media and how they interact with each other will be factors. Other factors will be dot placement accuracy and the ability of the dithering algorithm to avoid dot on dot ink placement. The number of patches required to do the profiling will also be determined by the number of colors that are in-line. A six color printer with all heads in-line will require more patches than a four color printer with all the heads in-line. In a simple case a two-headed printer, the maximum number of patches required would be 510; 255 for each of C and M for each direction. A practical upper limit of the number of patches on a test print is 4096. Increasing the number of patches much beyond this makes the time to measure all the patches quite lengthy. For estimation purposes, assume 4096 patches takes roughly 4 hours to measure with an automated colorimeter.

Normally the light and dark inks are combined in a manner that starts with the lighter ink, increasing the amount of this ink until DmaxL (maximum density possible with the light shade of ink) is reached and then starting to add in the normal ink, replacing at least one dot of light ink with one dot of the normal shade until only the darker ink is used reaching Dmax. This approach will be referred to hereinafter as ramp-up/ramp-down. The initial patches will be printed in this manner. However, in order to match the secondary direction to the primary direction, a simple ramp-up/ramp-down approach may not yield the closest possible match. For most patches, an exact match is likely obtainable using the standard approach but, for the those patches that were not matched, non-standard combinations of the light and normal ink will have to be used. For example, let's assume that patch number 200 in the primary direction has no matching patch from the secondary direction. Assuming patch number 255 has the highest density, normally, at this level, the normal density ink will be used almost exclusively. However, it may be that by adding a certain percentage of lighter ink, a closer match may be obtained than if normal ink were added.

The characterization method of the present invention involves designating one print direction as the primary direction (left-to-right) and the other as the secondary direction (right-to-left).

The achievable color gamut of the printer is first obtained. Test targets containing colored patches within the achievable color gamut are created, one for each direction, each preferably consisting of a wide range of colors or patches spanning the spectrum of a color space. They also preferably contain colors expected to lay outside the achievable color gamut of the printer as well as color patches within the achievable gamut.

A first test target is printed with the printer set to single-pass, uni-directional mode (printing in the primary direction only). This target is analyzed to determine the colorimetry of the output colors from a print in this direction only.

A second test target is printed with the printer set to single-pass, uni-directional mode (printing in the secondary direction only). This target is analyzed to determine the colorimetry of the output colors from a print in this direction only.

Both sets of colorimetry data produce a pair of color calibration tables specific to their respective print direction.

The next step of the present invention involves determining the mathematical intersection of the gamuts produced by printing in left-to-right mode only and by printing in right-to-left mode only. This is done by, first printing the left-to-right test target processed by the color calibration table associated with the primary print direction. Then, printing the right-to-left test target processed by the color calibration table associated with the secondary print direction and comparing each of the corresponding outputs. Colors which are within the gamut of both left-to-right only and right-to-left only printing are identified by their similarity or distance from each other in color space. In other words, if two corresponding color patches differ by delta $E<E0$, then these colors are within the gamut of each printing direction. Conversely, if two corresponding colors differ by an amount of delta $E>E0$, then the two colors are not within the intersection of the left-to-right only and right-to-left only printing modes. Thereafter and having obtained the gamut intersection of left-to-right and right-to-left printing modes, new calibration tables are generated for each printing direction with the starting gamut (range of achievable colors) based on a slightly smaller gamut than the gamut intersection identified. In other words, the common color gamut is clipped in both directions to the intersection of the gamuts achievable in each direction. This becomes the new starting gamut for the previously outlined iterative calibration process. Color calibration is subsequently performed in the manner previously detailed. Color calibration tables are successively generated for each of the left-to-right and right-to-left printing modes. Once calibration has been concluded for each print direction, the printer is now characterized to print in bi-directional mode.

Eventually, two color calibrations tables get generated. Hereinafter, the printer's color management engine will process image data contained within the primary direction (left-to-right) with the calibration table associated with that direction, and process image data contained within the secondary scanning swaths with the color calibration table associated with that print direction. The printer is now calibrated and can thereafter be set to single-pass bi-directional mode.

Figure 6:
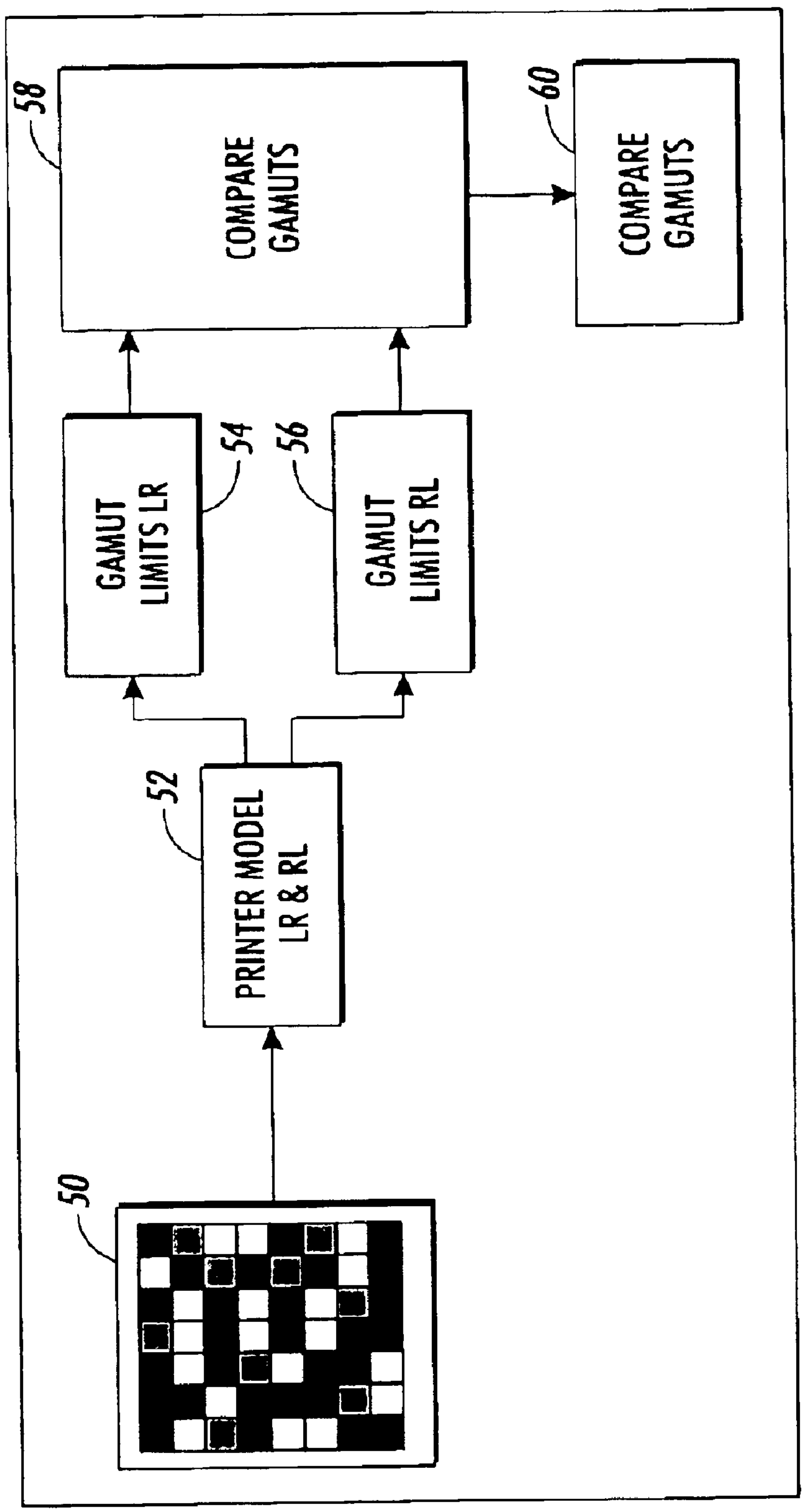
FIG. 6 is a flow diagram of the characterization process including gamut comparison of the left-to-right (LR) and right-to-left (RL) print directions to generate a final gamut description which characterizes the print device.

With reference now being made to FIG. 6, a flow diagram illustrates the characterization process using gamut comparison in the LR and RL print directions to generate a final gamut which characterizes the printing device. The printed test target of colored patches 50 are measured and the resulting data thereof is provided to the printer model 52 in both print directions. What is generated thereby, are gamut limits 54 for the LR print direction and gamut limits 56 for the RL print direction. Each of the gamut limits are compared 58 in accordance with the techniques described above to generate a final gamut description 60.

Figure 7:
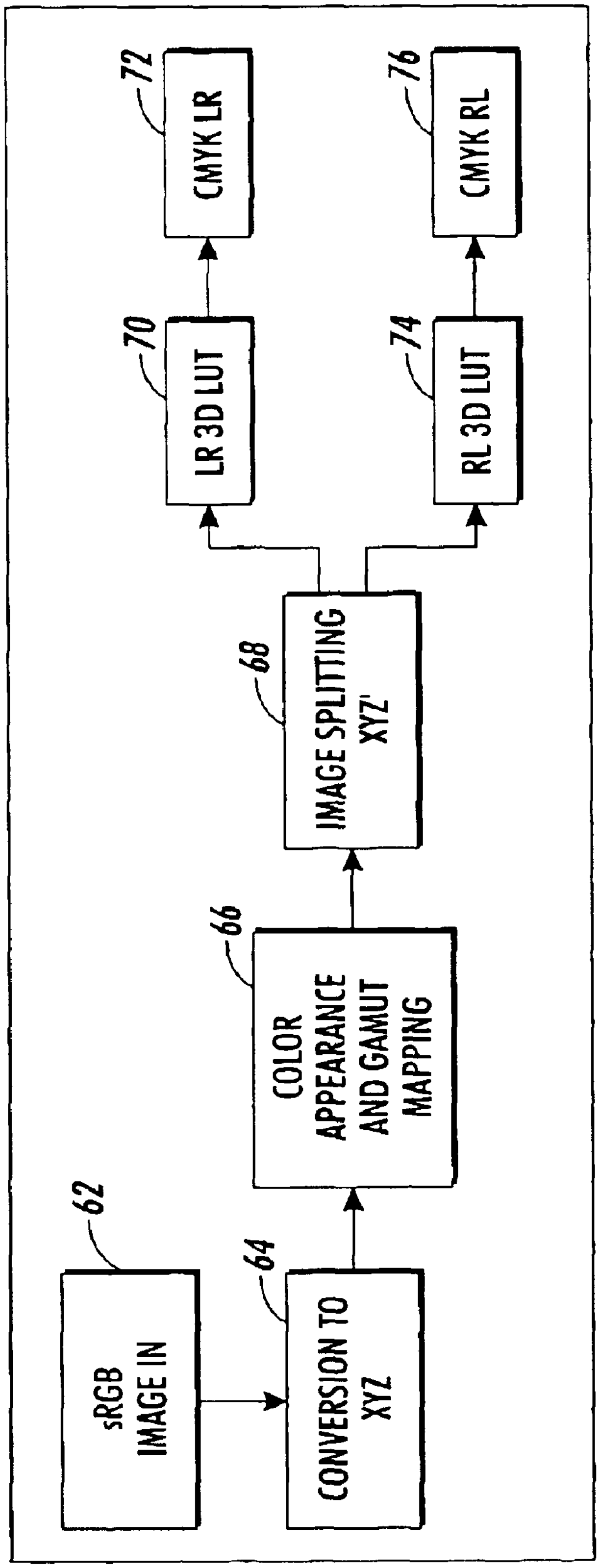
FIG. 7 a flow diagram illustrates the use of the final gamut description in a color management environment wherein gamut mapping is performed between two color spaces of different volume, for example between sRGB and Printer CMYK.

With reference now being made to FIG. 7, a flow diagram illustrates the use of the final gamut 60 of FIG. 6 in a color management environment wherein gamut mapping is performed between two color spaces of different volume, for example between an input image's sRGB 62 and the printing device's Printer CMYK. An input image's sRGB colors are converted 64 to XYZ color values and the color appearance is analyzed and a gamut mapping generated 66. The gamut-mapped image is then split 68, depending on which print order is to be used. The resulting values, in XYZ' color space, produce a look-up-table (LUT) 70 which is subsequently used to convert the desired XYZ values into Printer CMYK counts(values), at 72, specific to the LR print direction. Similarly, the resulting values, in XYZ' color space, produce a look-up-table (LUT) 74 which is subsequently used to convert the desired XYZ values into Printer CMYK counts(values), at 76, specific to the RL print direction. These are then halftoned and sent to the printer.

The method herein described is not for trying to match any particular color standard but, rather, to match the colors of one print direction with the other to minimize the banding caused by the printer's color ordering.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for improved characterization of bi-directional color reproduction devices, comprising:

a) obtaining a gamut of achievable colors that the printing device is expected to reproduce;

b) defining at least one color test target containing a plurality of color patches within the achievable gamut;

c) generating a color calibration table specific to a first direction of print;

d) generating a color calibration table specific to a second direction of print;

e) determining the intersection of the gamuts of achievable colors in left-to-right mode and in right-to-left mode;

f) defining a gamut smaller than the gamut of the intersection; and g) iteratively generating calibration tables using the defined smaller gamut as a common gamut starting point.

2. A method for improved characterization, as in claim 1, wherein the color test target contains a range of color patches spanning at least one color space.

3. A method for improved characterization, as in claim 1, wherein some of the plurality of color patches lay outside the achievable gamut of the printing device.

4. A method for improved characterization, as in claim 1, wherein the determination of the intersection of the gamuts comprises identifying a distance between two colors in color space.

5. A method for improved characterization, as in claim 1, wherein the defining of a smaller gamut involves clipping the gamut in both direction to the point of intersection.

6. A method for improved characterization, as in claim 1, further comprising, removing matched color pairs from a target page for the next iteration.

7. A method for improved characterization, as in claim 1, further comprising, computing a mapping from one color space to another.

8. A system for improved characterization of bi-directional color reproduction devices, comprising:

a processor; memory; storage media; and said memory storing a computer program causing said processor to execute an instruction set comprising:

obtaining a gamut of achievable colors that the printing device is expected to reproduce;

defining at least one color test target containing a plurality of color patches within the achievable gamut;

generating a color calibration table specific to a first direction of print;

generating a color calibration table specific to a second direction of print;

determining the intersection of the gamuts of achievable colors in left-to-right mode and in right-to-left mode;

defining a gamut smaller than the gamut of the intersection; and iteratively generating calibration tables using the defined smaller gamut as a common gamut starting point.

9. A system for improved characterization, as in claim 8, wherein the color test target contains a range of color patches spanning at least one color space.

10. A system method for improved characterization, as in claim 8, wherein some of the plurality of color patches lay outside the achievable gamut of the printing device.

11. A system for improved characterization, as in claim 8, wherein the determination of the intersection of the gamuts comprises identifying a distance between two colors in color space.

12. A system for improved characterization, as in claim 8, wherein the defining of a smaller gamut involves clipping the gamut in both direction to the point of intersection.

13. A system for improved characterization, as in claim 8, further comprising, removing matched color pairs from a target page for the next iteration.

14. A system for improved characterization, as in claim 8, further comprising, computing a mapping from one color space to another.

* * * * *